Patented Nov. 2, 1948

2,453,105

UNITED STATES PATENT OFFICE 2,453,105

PREPARATION OF HYDROXY AROMATIC CARBOXYLIC ACIDS

Enno Wolthuis, Cranford, and Henry M. Shafer, Westfield, N. J., assignors to General Aniline & Film Corporation, New York, N. Y., a corporation of Delaware No Drawing. Application November 15, 1945, Serial No. 628,986

14 Claims. (Cl. 260—315)

The present invention relates to the production of hydroxy aromatic carboxylic acid compounds. More particularly, the invention relates to the production of such compounds by the carboxylation with carbon dioxide of a potassium salt of a phenol suspended in a halogenated benzene as a diluent.

The production of hydroxy aromatic carboxylic acids is generally carried out by the so-called Kolbe synthesis which involves carboxylating alkali metal salts of phenols. Industrially, the process essentially consists in subjecting the dry alkali metal phenolates in the absence of any liquid diluents to carbon dioxide under pressure. However, this procedure requires special equipment and the phenolate is often formed as lumps rather than as a finely divided powder. It is more difficult to completely dry the phenolate so produced, and there is a tendency to local overheating and decomposition. To overcome the drawbacks of the "dry" method of carboxylation, it has been proposed to carry out the reaction in the presence of various solvents or diluents, such as water, naphthalene, paraffin, dioxane, pyridine, β-naphthol, and various phenols. However, the use of the heretofore proposed solvents introduces other drawbacks. Some cause side reactions, are corrosive on the reaction vessels, or are toxic. Others are affected by the carbon dioxide or are inflammable. Still others, like paraffin, have the disadvantage of limiting the temperature range for carboxylation by the melting point of the diluent, and are more difficult to remove from the reaction product.

According to our invention, we overcome these drawbacks and at the same time improve the yields of the reaction product by carrying out the carboxylating reaction on a potassium salt of a phenol suspended in a halogenated benzene as a diluent. While various types of halogenated benzenes may be utilized as, for example, chlorobenzene, bromobenzene, 1,2,4 trichlorobenzene, o-dibromobenzene, m-dichlorobenzene, we have found to be highly effective and particularly preferable, o-dichlorobenzene. It is non-corrosive to the reaction kettles, and is not affected by the carbon dioxide but entirely indifferent thereto. It is readily removable from the reaction product and more readily removes any water from the potassium salt of the phenol, thus eliminating any difficulty in obtaining a dry phenolate for carboxylation. Other advantages are that it is relatively non-inflammable and non-toxic.

By use of the potassium salt of a phenol in combination with o-dichlorobenzene we have found that the yields of the hydroxy carboxylic acids are greater than in the case of using the sodium salts of the phenols. We have also found in the carboxylation of those phenolates where two isomeric acids may be formed, such as in the case of β-naphthol, 2-hydroxy carbazole, and 2-hydroxy diphenylene oxide, that the principal product of the reaction is the 2-hydroxy 3-carboxylic acid isomer when there is used the potassium salt of these phenols with o-dichlorobenzene as the diluent, and that the formation of the 2-hydroxy-1-carboxylic acid isomer is suppressed. Since the 2.3 isomer is the generally desired isomer because of its great usefulness in the production of couplers for forming azo dyes, our process has this additional advantage which is not obtained when using the sodium salt.

Another additional feature of our invention is that what 2.1 isomer is present in the reaction product can readily be separated with potassium carbonate. We have found that the potassium salt of the 2.3 isomer is less soluble in a solution containing potassium carbonate than the potassium salts of the 2.1 isomers. Accordingly, it is an additional feature of our invention that the yield and purity of the 2.3 isomer can be further increased by salting out the reaction product with potassium carbonate.

By the use of the potassium salts of phenols and o-dichlorobenzene in accordance with our invention, hydroxy carboxylic acids can readily be obtained from a wide variety of phenols in good yields and high purity. As examples of the great variety of phenols that may be readily converted by our process into the corresponding hydroxy carboxylic acids may be mentioned 2-hydroxy diphenylene oxide, 2-hydroxy carbazole, 2-hydroxy α-benzocarbazole, 8-hydroxy quinoline, 5-amino-1-naphthol, 10-hydroxy-7,8-benzoquinoline, β-naphthol, α-naphthol, phenol, and the like.

According to our invention, the preformed potassium salt of the phenols may be utilized. However, according to a preferred modification of our invention, the potassium phenolate is produced and dehydrated in the o-dichlorobenzene, which is then utilized as the reaction mixture on which is carried out the carboxylation treatment. To form the potassium phenolate, the phenol selected is reacted with at least an equivalent amount of potassium hydroxide in the presence of the diluent. The water formed by the formation of the salt is then removed, a convenient way being to distill it off with part of the o-dichlorobenzene. The thus-dried reaction mixture of the potassium phenolate suspended in o-dichlorobenzene is then subjected to carboxylation with carbon dioxide. The dichlorobenzene may be removed from the reaction product resulting from the carboxylation by any suitable method. Steam distillation is highly suitable for this purpose. Any residues may be removed by filtration. The filtrate may then be acidified with any suitable acid, as for example, hydrochloric acid, where it is desired to convert the salt of the acid to the hydroxy carboxylic acid.

Where the phenol utilized forms 2-hydroxy-3-carboxylic acid and 2-hydroxy-1-carboxylic isomers, the isomers are readily separated by salting out the 2.3 isomer, the potassium salt of which is less soluble than the 2.1 isomer, by adding potassium carbonate to the reaction mass obtained after completion of the carboxylation operation.

The conditions for carrying out the reactions may be varied within wide limits. The optimum conditions will vary somewhat for each particular phenol. In forming the potassium salts, it is preferable to use at least one equivalent amount of potassium hydroxide for each equivalent amount of the phenol. Any suitable temperature may be utilized in the reaction to form the salt. In general, a range of about 100°–150° C. is preferable. In drying by distillation, it has been found to be highly desirable to remove only so much of the o-dichlorobenzene as to effect complete drying of the salt. The starting amount of o-dichlorobenzene is such as to leave sufficient thereof after distillation to form a fluid suspension of the salt. It is preferable to retain at least approximately 5 parts of the diluent for each part of the salt to insure maximum purity of the carboxylic acid formed by carboxylating the suspension.

The temperature and pressure at which the carboxylation reaction with carbon dioxide is effected may also be varied. However, at ordinary temperature and pressure, the yields are low and the products obtained are found to be of low purity. The temperature may, in general, range from 20° C. to approximately 210° C., although a preferred range is from about 150° C. to about 200° C. The pressures at which the reaction is carried out may extend up to about 250 pounds per square inch. However, a preferred range is from about 45–120 pounds per square inch.

Where phenols are utilized which produce two isomeric acids, such as 2-hydroxy-3-carboxy and 2-hydroxy-1-carboxy isomers, the separation of the isomers is based upon the difference of solubility of their potassium salts. We have found that the 2.3 isomer is less soluble than the 2.1 isomer and can be readily salted out by addition of potassium carbonate to the reaction mass after completion of the carboxylation. By utilizing large amounts of potassium carbonate, it is possible to increase the yield of the 2.3 isomer isolated. The mother liquid, after salting out, might contain a small quantity of both isomeric acids. When a sufficient amount of the mother liquid has been accumulated, these may be readily isolated by the same salting out procedure.

The compounds produced by the present invention can be used for various purposes. They are highly suitable for the production of coupling components used in the preparation of azo dyes. The following examples illustrate various methods of carrying out the present invention. It is to be understood that these examples are given by way of illustration and not by way of limitation.

Example 1

An iron autoclave, fitted with a stirrer, thermometer, gas inlet, and distillation outlet is charged with 45.8 parts of 2-hydroxycarbazole, 650 parts of o-dichlorobenzene and 16.8 parts of potassium hydroxide. The mass is heated to 120° C. and held at 120°–130° C. until the potassium salt is completely formed. About one-half of the dichlorobenzene is removed, together with all the water present by vacuum distillation at 120°–140° C. The mass is then heated to 150° C. and carbon dioxide is charged in periodically until the pressure reaches about 60 pounds per square inch. Heating is continued at 150° C., while maintaining the pressure at 60–63 pounds until the carboxylation is complete. The mass is cooled to 100° C., the pressure released, and the dichlorobenzene removed by steam distillation. The residue is diluted to 800 parts with water heated to 80° C. and sufficient acid, such as sulfuric, added to precipitate any unreacted 2-hydroxy carbazole which is then removed by filtration.

The filtrate is heated to 80° C. and 100 parts of potassium carbonate are added as a salting out agent, and the mass heated at 80°–90° C. until solution is effected. The solution is cooled rapidly to 20° C. and stirred to complete precipitation. The potassium salt of 2-hydroxycarbazole-3-carboxylic acid which precipitates is filtered and sucked dry. The cake is washed with 100 parts of 10% potassium carbonate solution. The filtrate and wash contain all of the potassium salt of 2-hydroxycarbazole-1-carboxylic acid isomer and only a small amount of the 2.3 isomer.

The potassium salt (filter cake) is sludged in 2000 parts of water and heated to 80° C. It is then acidified to Congo paper with HCl, heated to 90° C., and filtered. The 2-hydroxycarbazole-3-carboxylic acid is washed neutral with hot (50° C.) water and dried. The yield is 46.6–48.2 parts or 82–85% of theory. It can be readily converted into an arylide suitable as a coupler to form azo dyes.

Example 2

An iron autoclave fitted with an agitator, thermometer, gas inlet, and distillation outlet, is charged with 46 parts of 2-hydroxydiphenylene oxide, 14.0 parts of potassium hydroxide, and 600 parts of o-dichlorobenzene. The mass is heated to 100° C. and held at 100°–110° C. with stirring, to form the potassium salt. About one-half of the dichlorobenzene and all of the water is distilled off under vacuum at 120°–140° C. Dry carbon dioxide is charged into the mass at 155°–165° C. and up to 65 pounds pressure. The temperature is gradually raised to 200° C. and held at 200°–206° C. and at a pressure of 70–77 pounds until carboxylation is complete. The mass is cooled; the pressure is released; about 500 parts of water are added; and the dichlorobenzene is steam distilled off. The residual solution is filtered at 80° C. to remove any residues. 25 parts of potassium carbonate are added to the filtrate with stirring, cooled to 10° C., and filtered. The 2 - hydroxydiphenylene oxide - 3 - carboxylic acid is salted out while the 2-hydroxy diphenylene oxide-1-carboxylic acid is in the filtrate.

The filter cake is dissolved in 2000 parts of water at 90°–95° C. Some of the color is removed with about 10 parts of charcoal, filtered, and the 2-hydroxydiphenylene oxide-3-carboxylic acid is precipitated with hydrochloric acid. It is filtered, washed neutral, and dried at 70°-75° C. The yield is approximately 65% of theory.

Example 3

The process of Example 2 is repeated, the carboxylation procedure, however, being carried out at about 120 pounds carbon dioxide pressure and 200° C. The yield of the 2.3 isomer is approximately 75%.

Example 4

An iron autoclave is charged with 19.6 parts of 3'-hydroxy-7,8-benzocarbazole, 5.3 parts of potassium hydroxide and 600 parts of o-dichlorobenzene. The autoclave is heated with agitation to 150° C. and held at that temperature for one hour to complete the formation of the potassium salt. 300 parts of dichlorobenzene are distilled off under vacuum at 135°-150° C. After the distillation, the temperature is regulated to 150° C. and carbon dioxide is passed in until 250 pounds pressure is reached. A temperature rise of from 8 to 10° C. occurs at this point. The temperature is allowed to fall to 150° C. and carbon dioxide is added while maintaining a pressure of 250 pounds. After no further pressure drop is noted over a period of 15 minutes, the autoclave is heated at 195°-200° C. for nine hours.

The dichlorobenzene is removed by steam distillation and any residues removed by filtering. On reducing the pH to 8-8.2 with HCl about 2.5 parts of unchanged hydroxybenzocarbazole separates from the solution at 90°-100° C. and is filtered off. On acidifying the filtrate, the 3'-hydroxy-7,8-benzocarbazole-2'-carboxylic acid separates out. The mass is filtered at 25° C., and washed with hot water until neutral. The yield is 12.8–13.9 parts.

Example 5

An autoclave is charged with 40 parts of 5-amino-1-naphthol, 15.6 parts potassium hydroxide, 25 parts water, 500 parts o-dichlorobenzene, and 2 parts of a wetting agent such as isobutyl naphthalene sodium sulfonate.

With vigorous agitation the mixture is heated at 115-120° C. until the formation of the potassium salt is complete. Suspension of the salt in the o-dichlorobenzene is facilitated by the wetting agent. Vacuum is then applied and about 200 parts o-dichlorobenzene is distilled off together with the water. The temperature is then raised to 150° C. and carbon dioxide is injected up to about 75 pounds per square inch. The temperature is raised further to 175° C. and maintained until the carboxylation reaction is completed. The reaction mass is then cooled to about 100° C. and the pressure is released. About 1400 parts of water are then added and the o-dichlorobenzene removed by steam distillation. Carbon dioxide is then introduced to adjust the acidity to a pH of 7-8. The precipitated impurities are filtered off. The product, 5-amino-1-hydroxy-2-naphthoic acid, is isolated in good yield from the filtrate by the addition of hydrochloric acid.

Since the potassium salts of the phenols are not appreciably soluble in the halogenated benzene compounds utilized as diluents, it would ordinarily be expected that good yields of the hydroxy carboxylic acids would not be obtained and that the reaction would not proceed smoothly. Contrary to what would be expected, our invention results in the unexpected and important advantages of good yields, high purity of product, ease of separation of isomers and smooth operation.

We claim:

1. A process of carboxylating a phenol which comprises subjecting the potassium phenolate thereof suspended in a halogenated benzene to reaction with carbon dioxide.

2. A process of carboxylating a phenol which comprises subjecting the potassium phenolate thereof suspended in a halogenated benzene to reaction with carbon dioxide at an elevated temperature up to about 210° C. and under a superatmospheric pressure up to about 250 pounds per square inch.

3. A process of carboxylating a phenol which comprises subjecting the potassium phenolate thereof suspended in o-dichlorobenzene to reaction with carbon dioxide at a temperature between about 150 and 200° C. and under a pressure of from about 45 to 120 pounds per square inch.

4. A process of carboxylating a phenol which comprises subjecting the potassium phenolate thereof suspended in a halogenated benzene in the proportion of 1 part to at least 5 parts of the latter to reaction with carbon dioxide.

5. A process of carboxylating a phenol which comprises subjecting the potassium phenolate thereof suspended in o-dichlorobenzene in the proportion of 1 part to at least 5 parts of the latter to reaction with carbon dioxide.

6. A process of carboxylating a phenol which comprises converting the phenol to the phenolate by reaction with potassium hydroxide in a halogenated benzene as diluent, drying the mixture by distillation while retaining therein sufficient of the diluent to provide a suspenson of 1 part of the potassium phenolate to at least 5 parts of the diluent and reacting the dry suspension of the phenolate with carbon dioxide, the diluent being present initially in amount sufficient to provide the combined requirements of the distillation step and of the dry suspension of the phenolate.

7. The process of claim 6, wherein the diluent is o-dichlorobenzene.

8. A process of preparing 2-hydroxycarbazole-3-carboxylic acid which comprises subjecting the potassium salt of 2-hydroxycarbazole suspended in o-dichlorobenzene to reaction with carbon dioxide at a temperature of about 150° C. and under a pressure of about 60 pounds per square inch.

9. A process of preparing 3'-hydroxy-7,8-benzocarbazole-2'-carboxylic acid which comprises subjecting the potassium salt of 3'-hydroxy-7,8-benzocarbazole suspended in o-dichlorobenzene to reaction with carbon dioxide at a temperature from about 150 to 200° C. and under a pressure of about 250 pounds per square inch.

10. A process of preparing 2-hydroxydiphenyleneoxide-3-carboxylic acid which comprises subjecting the potassium salt of 2-hydroxydiphenyleneoxide suspended in o-dichlorobenzene to contact with carbon dioxide at an initial temperature of about 155° C., gradually increasing the temperature of the mixture, and conducting the reaction at temperatures within the range of about 155 to 206° C. and under pressures within the range of about 65 to 120 pounds per square inch.

11. A process of resolving a mixture of the potassium salts of the 2,1 and 2,3 isomers of an hydroxy aromatic carboxylic acid contained in aqueous solution which comprises salting out the potassium salt of the 2,3-hydroxy aromatic carboxylic acid by the addition of potassium carbonate to the solution.

12. The process of claim 11, wherein the isomeric mixture consists of the potassium salts of the 2,1 and 2,3-hydroxycarbazole carboxylic acids.

13. The process of claim 11, wherein the isomeric mixture consists of the potassium salts of the 2,1 and 2,3-hydroxydiphenyleneoxide carboxylic acids.

14. A process of preparing a 2,3-hydroxy aromatic carboxylic acid from a phenol which by carboxylation yields a mixture of the isomeric 2,1- and 2,3-hydroxy aromatic carboxylic acids which comprises carboxylating the phenol by subjecting it as the potassium phenolate suspended in a halogenated benzene to reaction with carbon dioxide, removing the halogenated benzene from the reaction mixture by steam distillation leaving an aqueous mixture of the potassium salts of the isomeric 2,1- and 2,3-hydroxy aromatic carboxylic acids and separating therefrom the potassium salt of the 2,3-hydroxy aromatic carboxylic acid by salting out with potassium carbonate.

ENNO WOLTHUIS.
HENRY M. SHAFER.

REFERENCES CITED

The following references are of record in the file of this patent:

UNITED STATES PATENTS

| Number | Name | Date |
|---|---|---|
| 1,503,984 | Cone | Aug. 5, 1924 |
| 1,648,839 | Calcott | Nov. 8, 1927 |
| 1,819,127 | Schmelzer | Aug. 18, 1931 |
| 2,050,958 | Muth | Aug. 11, 1936 |
| 2,132,356 | Lecher | Oct. 4, 1938 |
| 2,132,357 | Lecher | Oct. 4, 1938 |
| 2,161,524 | Morschel | June 6, 1939 |
| 2,193,336 | Lecher | Mar. 12, 1940 |

FOREIGN PATENTS

| Number | Country | Date |
|---|---|---|
| 593,506 | Germany | Mar. 1, 1934 |